(12) United States Patent
Reinhold

(10) Patent No.: US 12,511,945 B2
(45) Date of Patent: Dec. 30, 2025

(54) DEVICE AND METHOD FOR CONTACTLESS RECORDING OF FINGERPRINTS AND HANDPRINTS

(71) Applicant: IDLOOP GMBH, Jena (DE)

(72) Inventor: Bernd Reinhold, Jena (DE)

(73) Assignee: IDLOOP GMBH, Jena (DE)

( * ) Notice: Subject to any disclaimer, the term of this patent is extended or adjusted under 35 U.S.C. 154(b) by 0 days.

(21) Appl. No.: 18/557,026

(22) PCT Filed: May 4, 2022

(86) PCT No.: PCT/EP2022/062031
§ 371 (c)(1),
(2) Date: Oct. 24, 2023

(87) PCT Pub. No.: WO2022/233964
PCT Pub. Date: Nov. 10, 2022

(65) Prior Publication Data
US 2024/0221431 A1    Jul. 4, 2024

(30) Foreign Application Priority Data

May 4, 2021    (DE) ..................... 10 2021 111 422.5

(51) Int. Cl.
*G06V 40/60*  (2022.01)
*G06V 40/13*  (2022.01)

(52) U.S. Cl.
CPC .......... *G06V 40/67* (2022.01); *G06V 40/1312* (2022.01); *G06V 40/1318* (2022.01)

(58) Field of Classification Search
CPC ................... G05G 9/047; G06V 40/67; G06V 40/12–1324; G06V 40/1394;
(Continued)

(56) References Cited

U.S. PATENT DOCUMENTS

2008/0107309 A1* 5/2008 Cerni ..................... G06V 40/67
  382/115
2008/0150913 A1* 6/2008 Bell ........................ G06F 3/011
  345/175
(Continued)

FOREIGN PATENT DOCUMENTS

EP    2506189 A2   10/2012
EP    2854097 A1    4/2015
(Continued)

OTHER PUBLICATIONS

Wei Li et al. "A Novel 3-D Palmprint Acquisition System" IEEE Transactions on Systems, Man and Cybernetics. Part A:Systems and Humans, IEEE Service Center, Piscataway, NJ, US, vol. 42, No. 2, Mar. 2012 (Mar. 2012), pp. 443-452 DOI: 10.1109/TSMCA.2011. 2164066 ISSN: 1083-4427, XP011416650 abstract; figures 3,4, 7.

(Continued)

*Primary Examiner* — Amr A Awad
*Assistant Examiner* — Aaron Midkiff
(74) *Attorney, Agent, or Firm* — Procopio, Cory, Hargreaves & Savitch LLP

(57) ABSTRACT

A device, for contactless optical recording of a papillary structure of a hand or parts thereof, includes a lighting unit illuminating the hand or parts thereof with emitted structured light, and a camera detecting structured light emitted from the lighting unit, which is diffusely reflected from the hand or parts thereof in an object plane of the camera. A nonzero difference in distances between the camera along an optical axis of an optical path of the camera and the lighting unit along an optical axis of an optical path of the lighting unit from the object plane of the camera is present in order to determine a position of the hand or parts thereof along the optical axis of the optical path of the camera in relation to (Continued)

Figure 1:
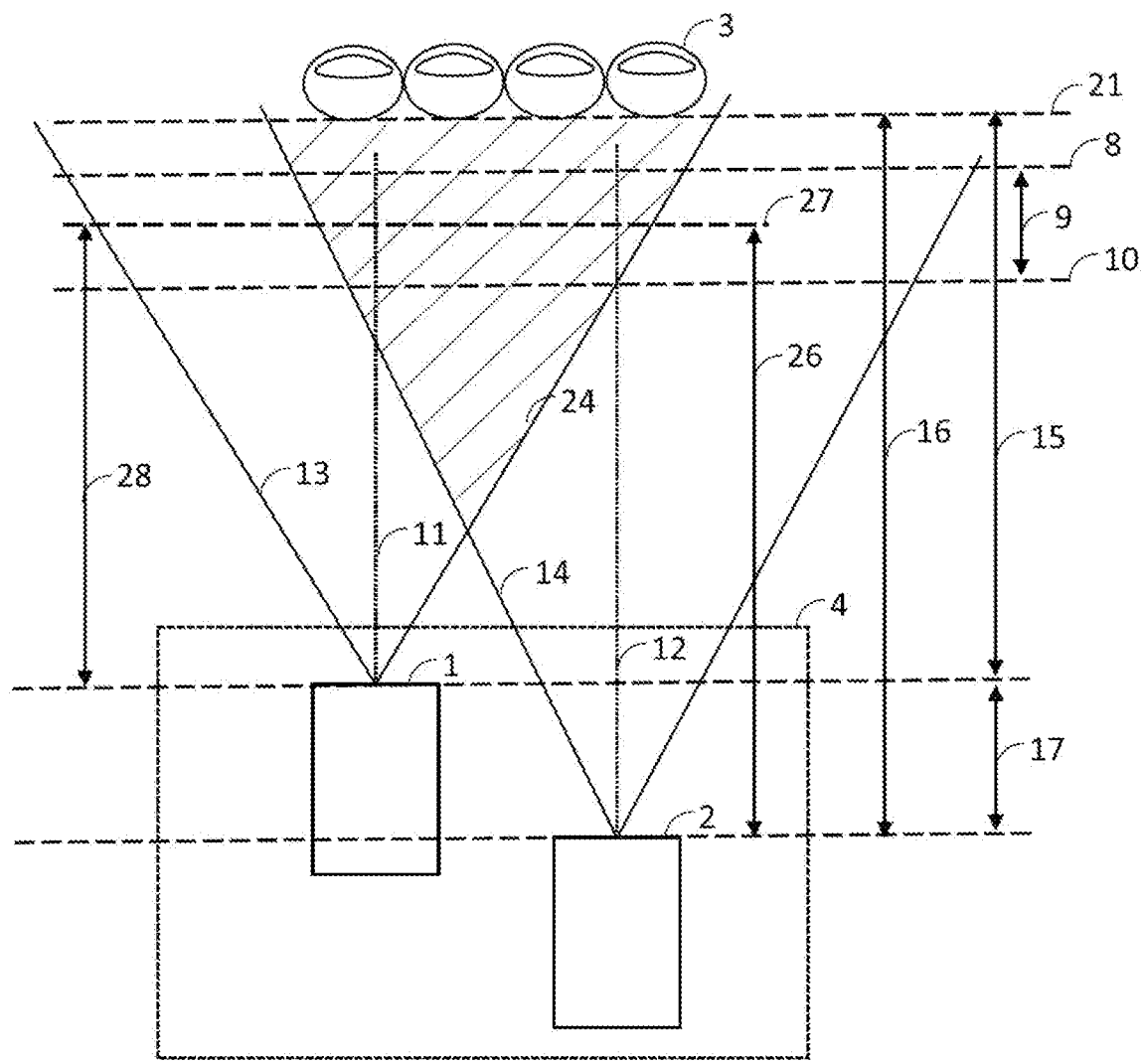

a range of depth of field of the camera using a structure size determined in the light detected by the camera.

16 Claims, 17 Drawing Sheets

(58) Field of Classification Search
CPC .... G06V 10/42; G06V 10/431; G06V 30/187; G06V 20/64; G06V 2201/12; G06V 10/145; A61B 5/1172; G06F 3/042–0428; G06F 21/32; G06F 2203/04101; G01B 11/2545; G01B 11/24–255; G01B 11/245; G01B 9/00–10; G01B 11/00–306; G01B 11/026; G01B 11/25–255; G01B 11/2513; G06T 7/521; G02B 27/00–648; G02B 2027/0105–0198
See application file for complete search history.

(56) References Cited

U.S. PATENT DOCUMENTS

| | | | |
|---|---|---|---|
| 2011/0235871 A1* | 9/2011 | Byren | G06V 10/145 356/511 |
| 2012/0250947 A1* | 10/2012 | Abramovich | G06V 40/1312 382/115 |
| 2013/0141538 A1 | 6/2013 | Panah et al. | |
| 2013/0321585 A1* | 12/2013 | Hassebrook | H04N 13/204 348/46 |
| 2015/0208059 A1* | 7/2015 | Hassebrook | G01B 11/254 348/46 |
| 2018/0174284 A1* | 6/2018 | Semba | G06T 7/77 |
| 2018/0330142 A1* | 11/2018 | Trouboul | G06V 40/1312 |

FOREIGN PATENT DOCUMENTS

| | | |
|---|---|---|
| JP | H01287785 A | 11/1989 |
| JP | 2006139592 A | 6/2006 |
| JP | 2006172258 A | 6/2006 |
| JP | 2006189917 A | 7/2006 |
| JP | 2006255430 A | 9/2006 |
| JP | 2007514241 A | 5/2007 |
| JP | 2012212432 A | 11/2012 |
| JP | 2013089230 A | 5/2013 |
| JP | 2017093904 A | 6/2017 |
| WO | 2005057921 A | 6/2005 |
| WO | 2018073335 A | 4/2018 |

OTHER PUBLICATIONS

Paniagua Carmen et al. "Omnidirectional Structured Light in a Flexible Configuration" Sensors, vol. 13, No. 10, Oct. 14, 2013 (Oct. 14, 2013), pp. 13903-13916 DOI: 10.3390/sl 31013903 XP055943914 abstract.
Patrick Wissmann et al. "Fast and low-cost structured light pattern sequence projection" Optics Express, US, vol. 19, No. 24, Nov. 21, 2011 (Nov. 21, 2011), p. 24657 DOI: 10.1364/0E.19.024657 ISSN: 2161-2072, XP055245244 abstract; figure 1.
Patent Cooperation Treaty, International Search Report, Application No. PCT /EP2022/062031, dated Aug. 1, 2022, in 6 pages.
Notice of reasons for Refusal dated Oct. 22, 2024, in Japanese application No. 2023-567129, 13 pages.
The examination about the SATO, Taku woods, the simple three-dimensional instrumentation system based on [outside] five persons and laser diffraction light, and its application, Proceedings of Workshop of the Institute Image Information and Television Engineers, Japan, Institute of Image Information and Television Engineers (one company), Aug. 12, 2013, 37th volume No. 36, p. 31-34.

* cited by examiner contact-based                contactless state of the art

DEVICE AND METHOD FOR CONTACTLESS RECORDING OF FINGERPRINTS AND HANDPRINTS

CROSS-REFERENCE TO RELATED APPLICATIONS

This application is a US National Stage of International Patent Application PCT/EP2022/062031, filed May 4, 2022, which claims benefit of priority from German Patent Application 10 2021 111 422.5, filed May 4, 2021, the contents of both of which are incorporated herein by reference.

The invention relates to a device and a method for contactless optical recording of the papillary structure of a hand or parts thereof, which are equivalent to contact-based prints.

Authorities-compliant (contact-based) multi-finger scanners are characterized by the image field being at least 3.2"×3.0" (W×H) with a scanning of 500 ppi. If one takes into account that in a contactless recording of a finger, the curved surface of a finger should be scanned up to a defined tolerance angle 7 with 500 ppi, as shown schematically in FIG. 2, in order to capture the same area as with contact-based scanners, a significant oversampling (>500 ppi based on a virtual measurement plane) must occur. The resulting amount of data can usually only be converted into 3D coordinates with a non-negligible amount of time, meaning that real-time control of the hand position in 3D space is difficult when using conventional measurement technology. For the actual measuring task of recording a high-resolution fingerprint, the camera 2 has a specific, narrow range of depth of field in which the papillary structure of the finger can only be imaged in focus. If the hand or finger is outside the depth of field of the camera 2, a faithfully detailed recording is not possible.

Known devices for contactless recording of fingerprints have different approaches to how the hand or finger position can be limited or recorded.

U.S. Pat. No. 10,460,145 B2 discloses a device for contactless optical recording of the features of a hand by two lighting sources and a camera. In order to take fingerprints, the hand must be moved through a vertically restricted space.

U.S. Pat. No. 8,600,123 B2 describes a device for contactless fingerprint recording with a recording volume being structurally limited in three dimensions and at least one camera for contactless recording of the fingers. From KR 2019 0097706 A1 a device for contactless fingerprint recording is known, which requires a distance sensor in addition to the recording camera.

In DE 10 2019 126 419 A1, the device for contactless fingerprint recording is equipped with a multicolored lighting unit and at least two cameras for 3-dimensional recording of the papillary structure of a hand.

Further devices for optically imaging the papillary structure of fingers, which have similarly complex additional devices for position detection, are known, for example, from U.S. Pat. No. 8,971,588 B2.

Furthermore, U.S. Pat. No. 10,885,297 B2 describes a device for the contactless recording of biometric data, in which a camera and a light source are directed into an image recording area and which comprises a housing guide with a shaft to which a frame held above the electronic unit is attached, which surrounds the recording area laterally, and an entrance gap for hand insertion. The shaft defines to the frame the distance between the hand to be measured and the recording camera for hand or finger imaging. The disadvantage, however, is that additional hardware such as an IR sensor is required to localize the hand or determine the hand position. This IR sensor should also be used to trigger the light source and the camera. Exact knowledge of the hand position is important in order to realize a quick application scenario in which only full 3D images are generated and then processed when the hand is in the correct position.

The invention is based on the object of finding a new possibility for contactless fingerprint recording of a hand or parts thereof, which allows real-time hand distance detection for 3D image data recording of fingerprints, without requiring additional distance sensors or other additional hardware for allocating a distance to a high-resolution camera.

The object is achieved according to the invention by claims 1 and 13.

Advantageous embodiments are described in the dependent claims.

The invention is based on the idea that exact knowledge of the current hand position is necessary in order to start the 3D recording or processing or to provide the user of the scanner with correction suggestions for hand positioning.

The invention is based on the basic idea of dispensing with additional multi-part distance sensors for hand distance recognition (hand position) and for generating highly accurate 3D image data of the hand or parts thereof using a specially arranged camera-projector combination and structured illumination of the hand in contactless fingerprint recordings. The 3D image data of the preceded distance detection is determined from the camera image, and if a permissible hand position is present, the high-precision 3D image data is reconstructed pixel by pixel from a high-resolution imaged fingerprint image and converted into a two-dimensional fingerprint image in a followed process.

The hand position detection should be carried out, without additional sensors, spatial limitation measures or complex scanning procedures, as distance determination between hand and camera with small computational effort and used as distance information either to offer the user of the device correction suggestions for correcting the position of the hand or to focus the camera accordingly or in order to start the highly accurate reconstruction of the 3D image data when the correct position for recording the hand is present.

The device comprises a lighting unit for illuminating a spatial area with structured light, in which the range of depth of field of the camera also lies, the camera being configured to detect light that is diffusely reflected from a hand or parts thereof in the object plane. For this purpose, the lighting unit has a different distance from the range of depth of field of the camera, since only then is the structure size of the structured lighting on the sensor of the camera a function of the distance of the hand to the camera, thus enabling rapid spatial positioning of the hand or parts thereof in relation to the device for fingerprint recording by determining the structure size.

The invention realizes a new possibility for contactless fingerprint recording of a hand or parts thereof, which allows real-time hand distance detection for 3D image data recording of fingerprints without requiring additional distance sensors or auxiliary frames for allocating a distance to a high-resolution camera.

Figure 2:
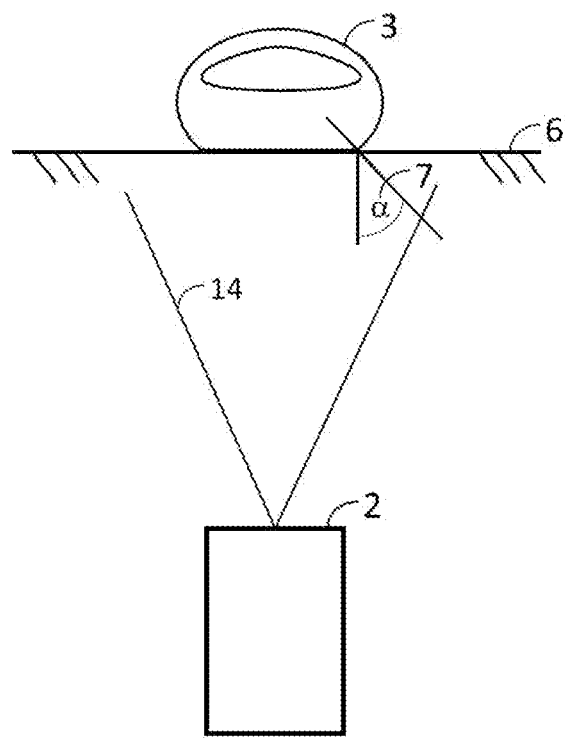
Figure 2:
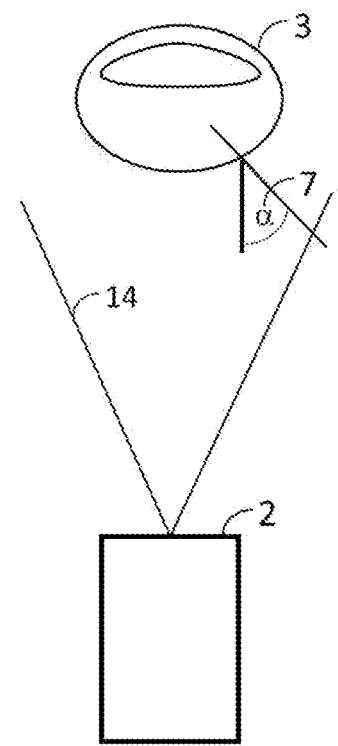
Figure 3:
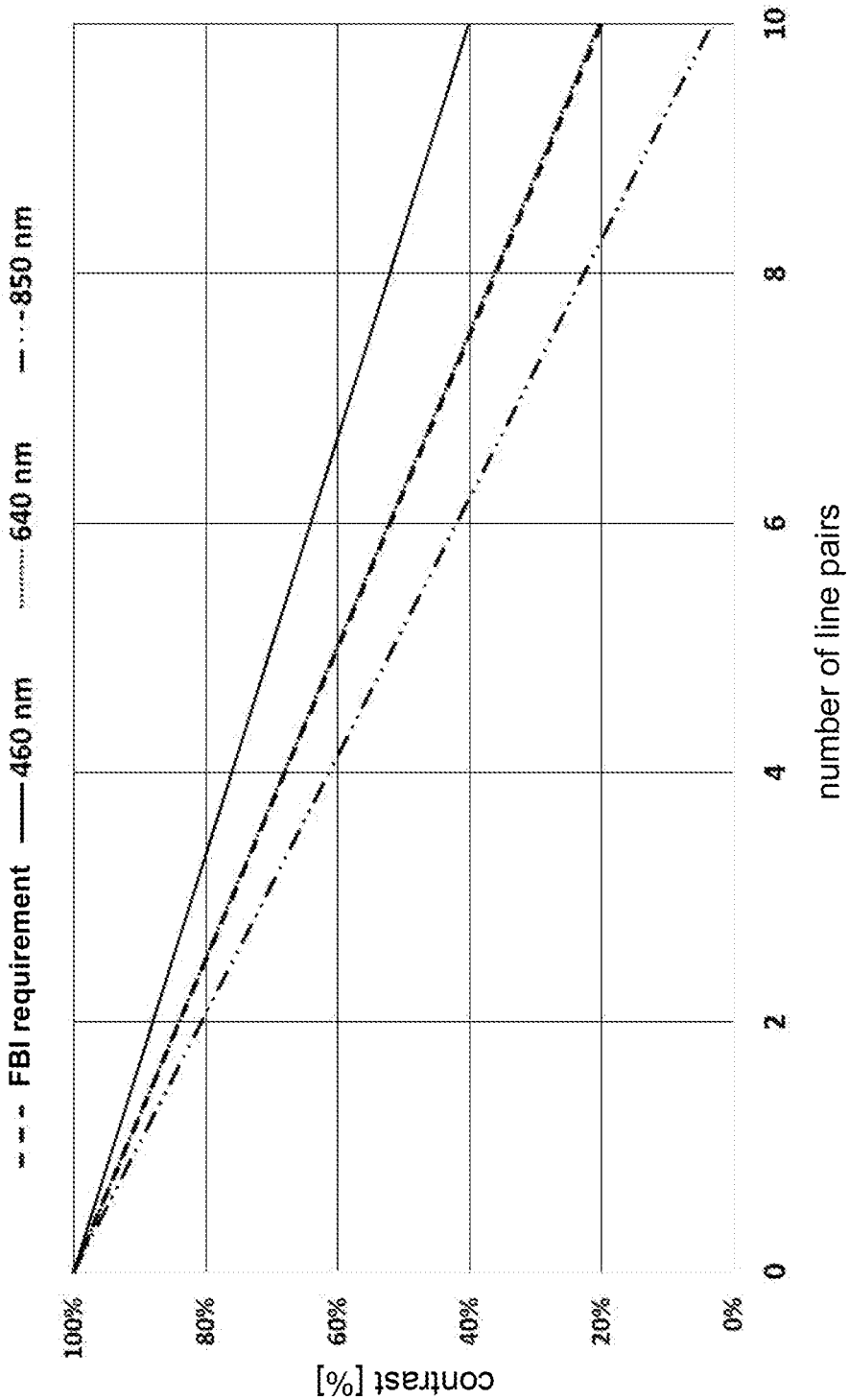
Figure 4:
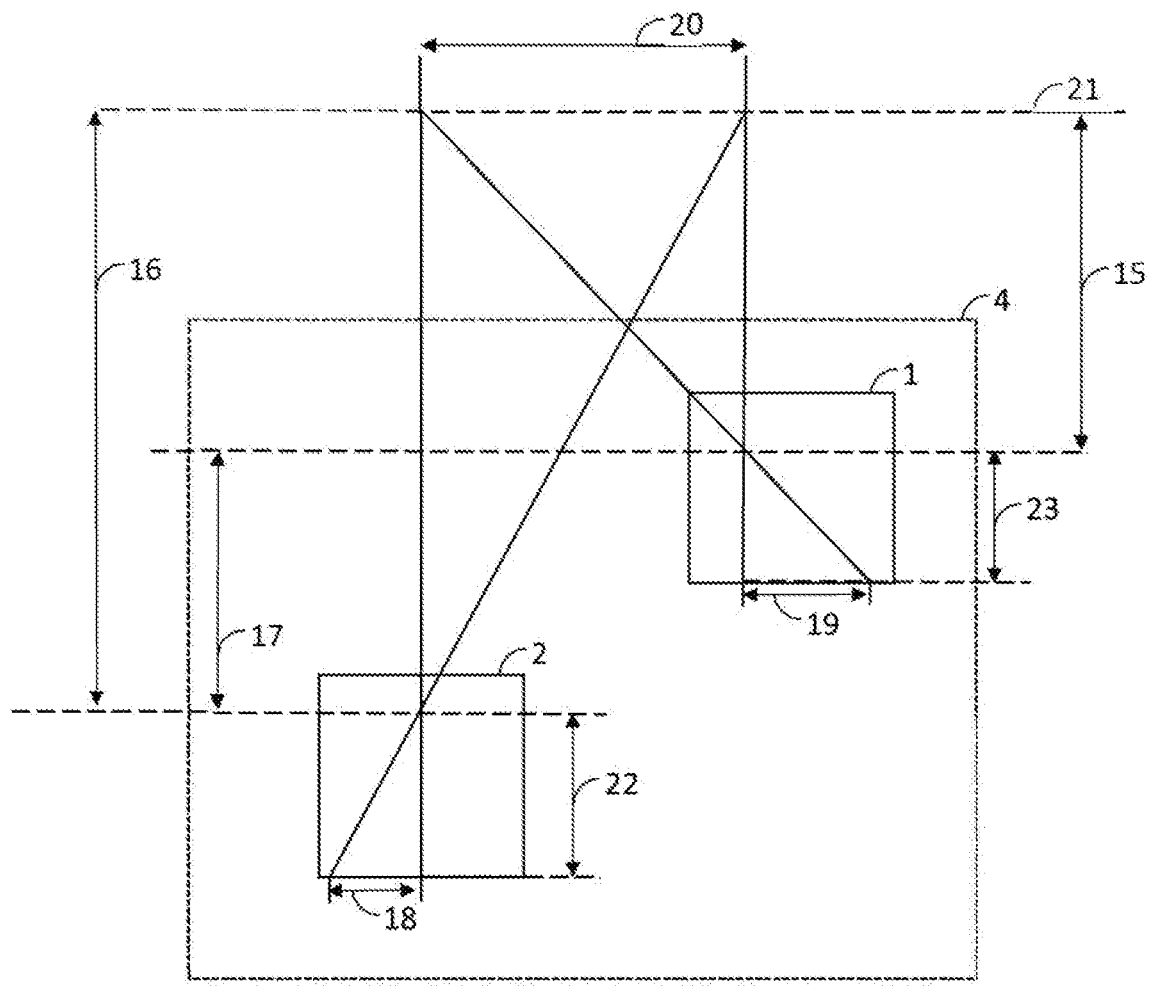
Figure 5:
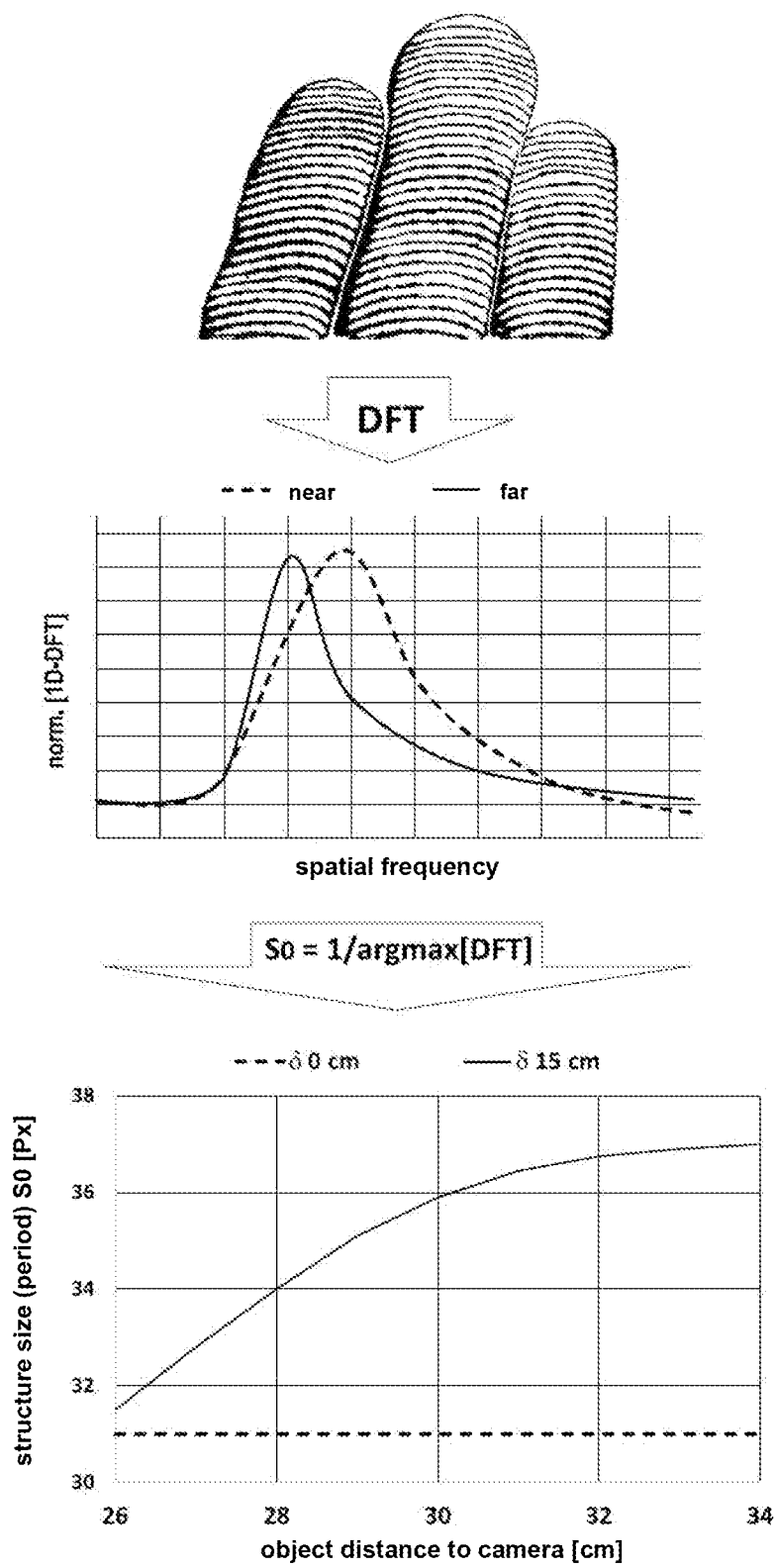
Figure 6:
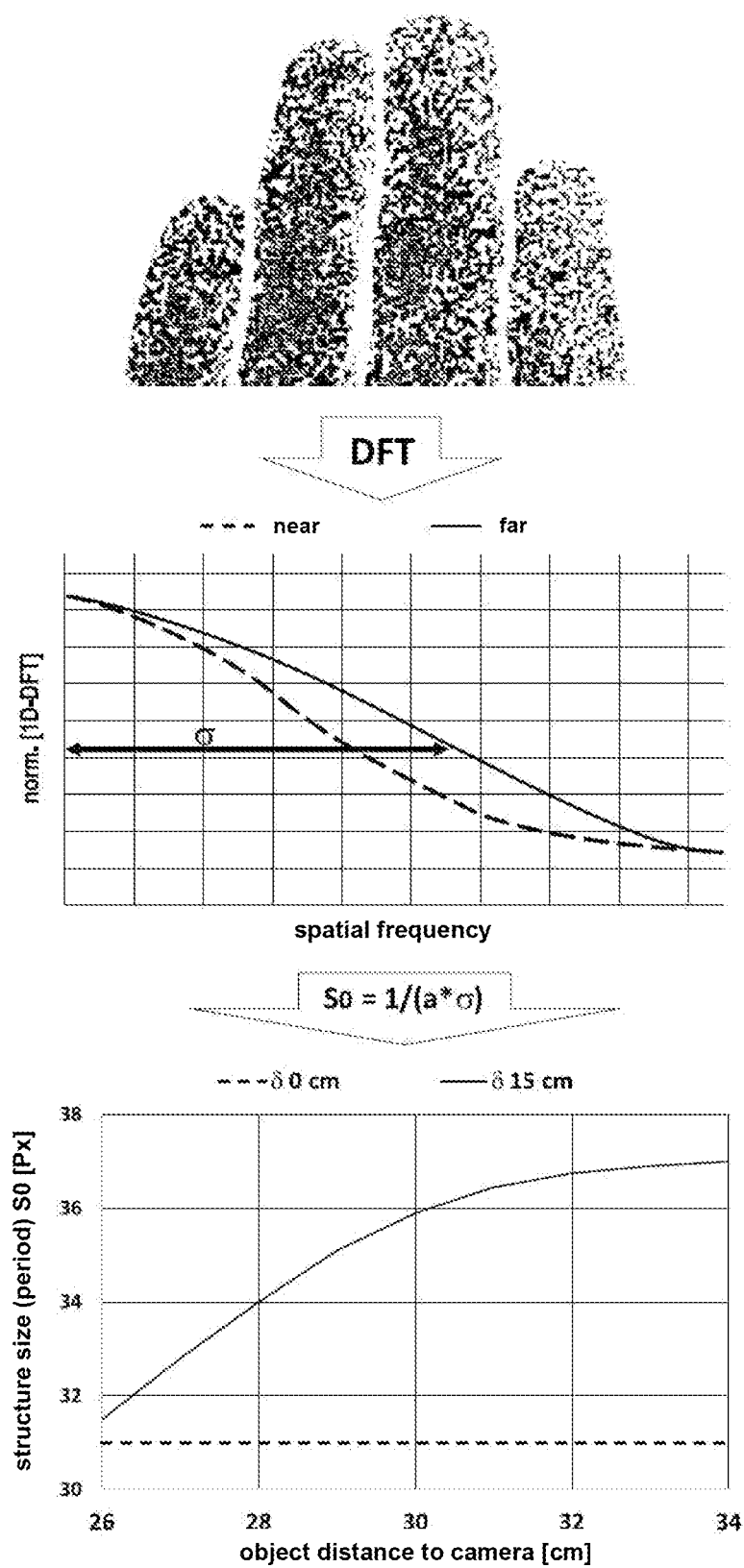
Figure 7:
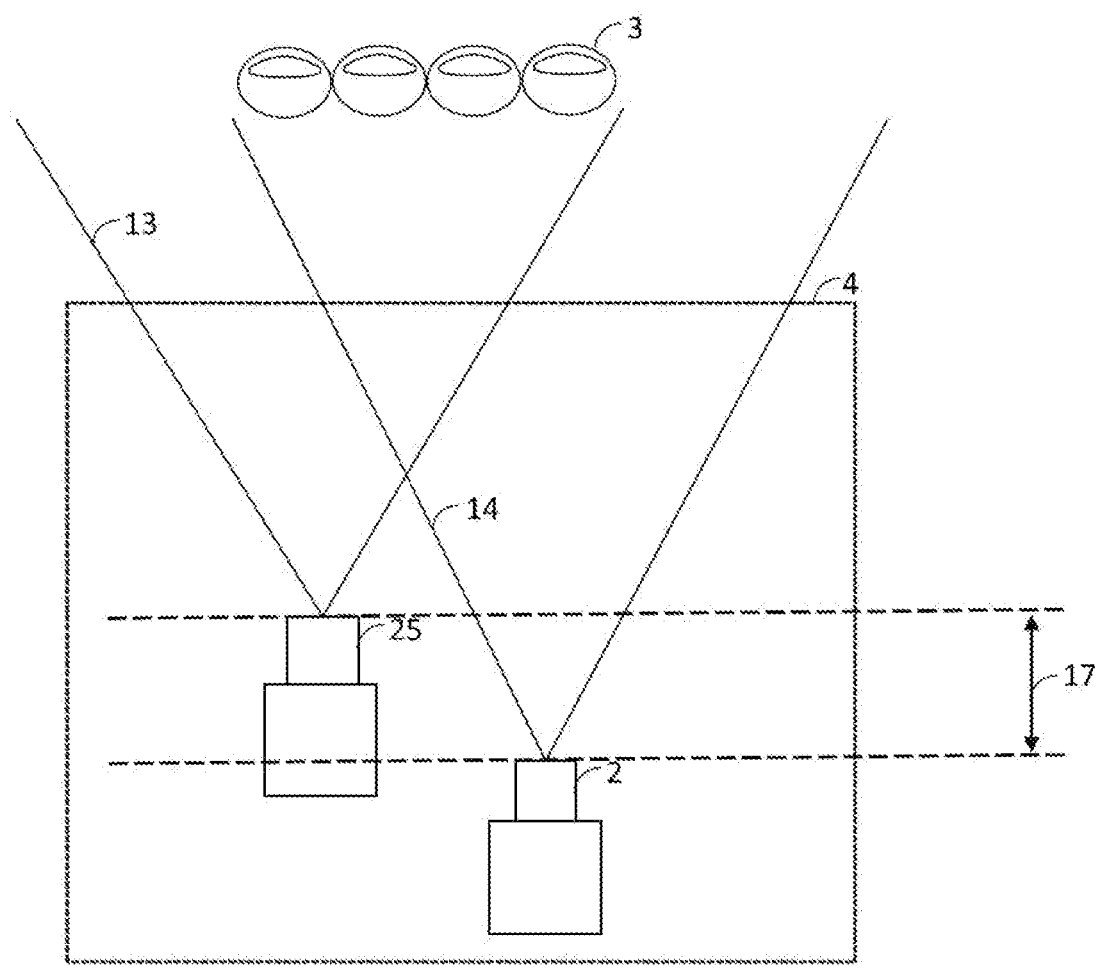
Figure 8:
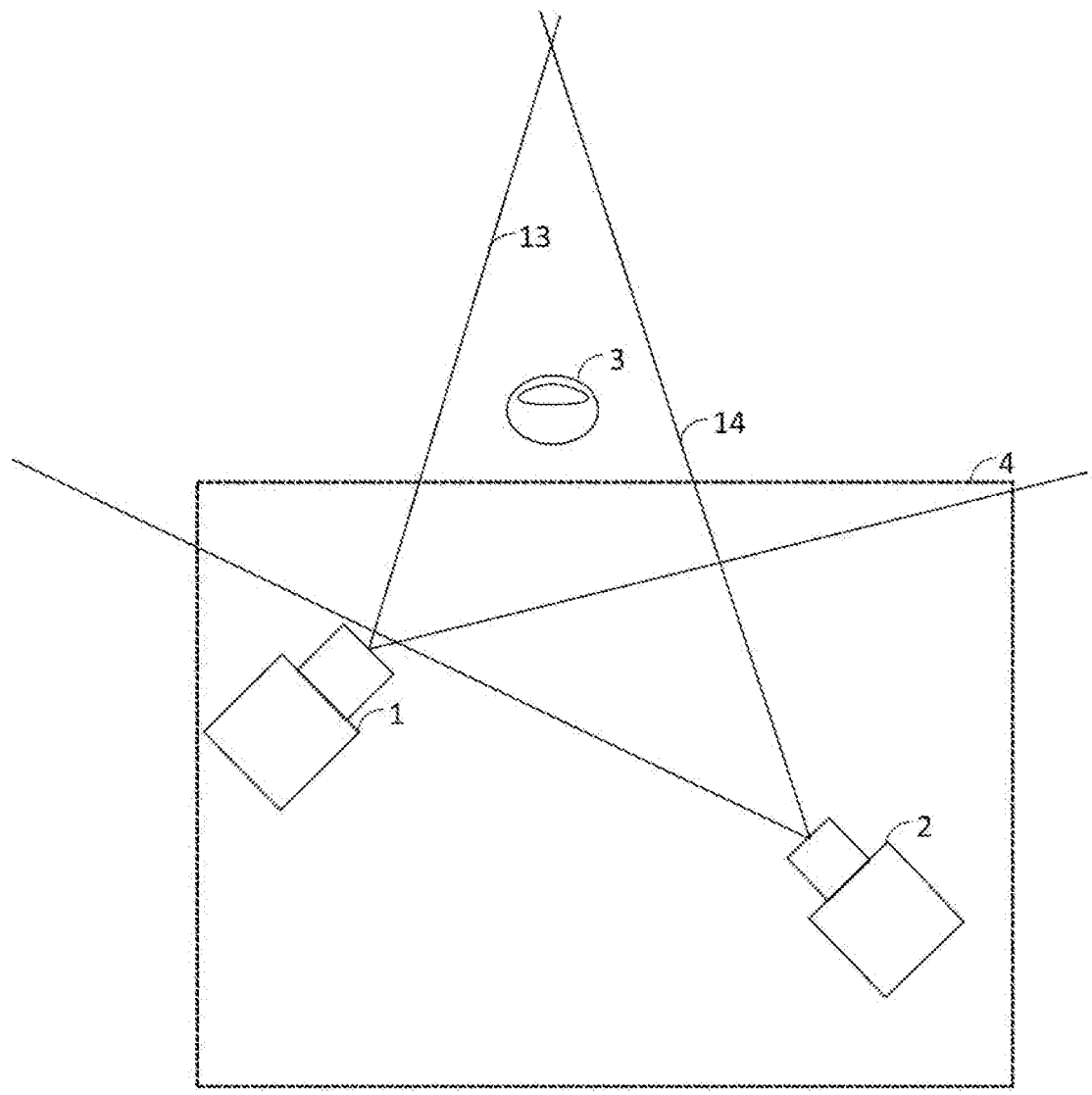
Figure 9:
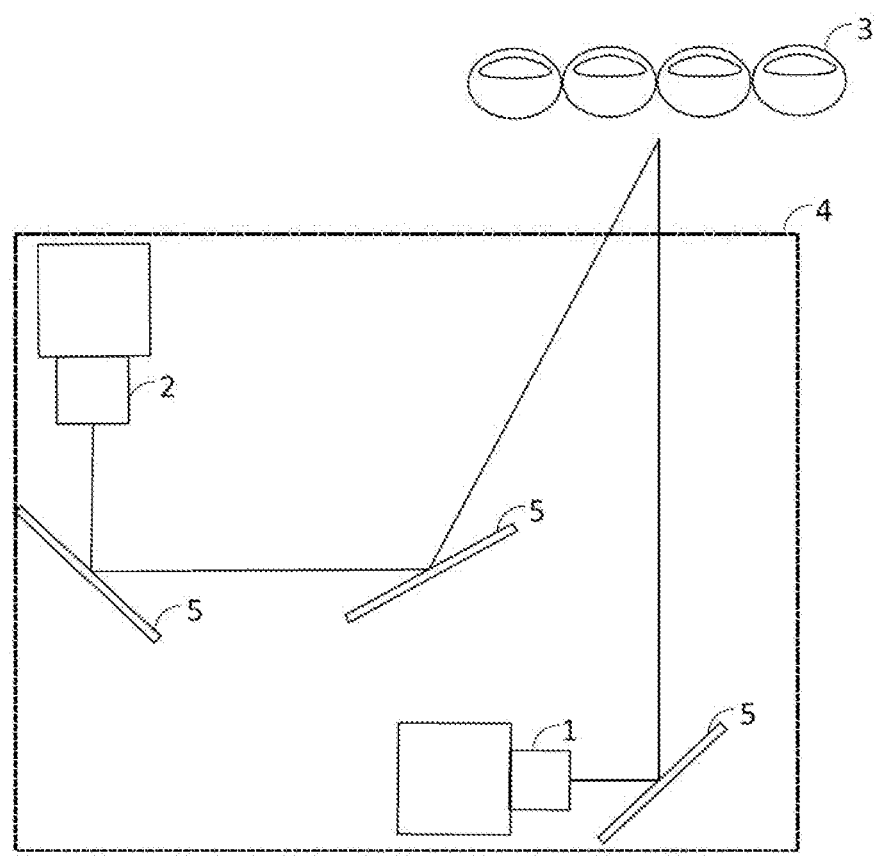
Figure 10:
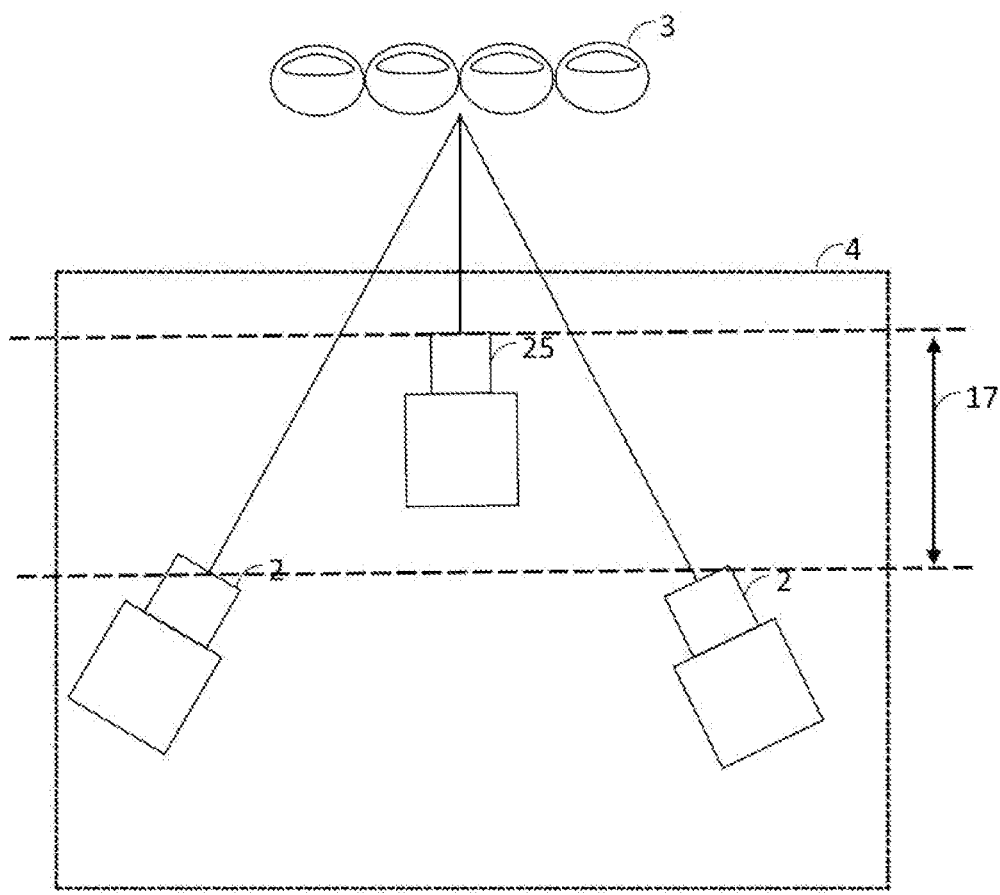
Figure 11:
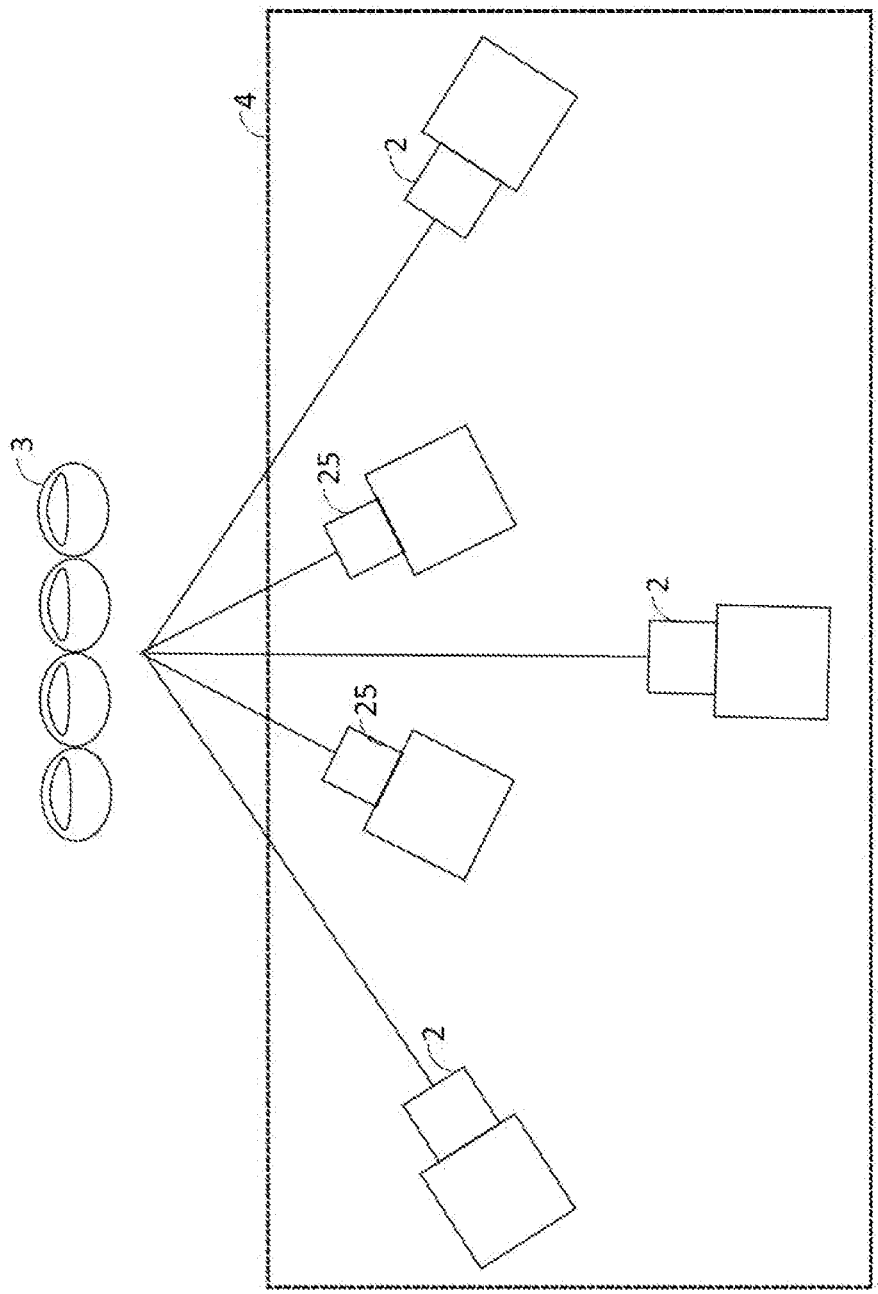
Figure 12:
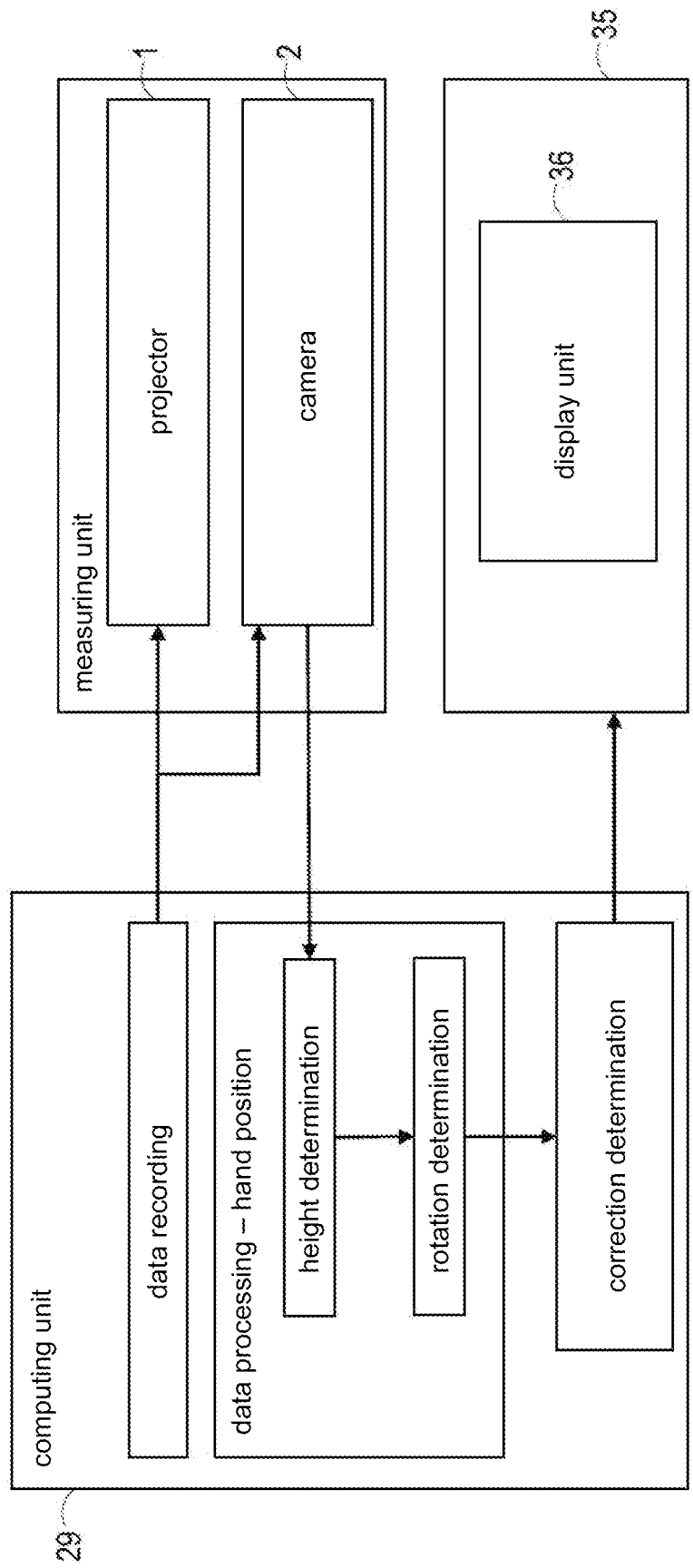
Figure 13:
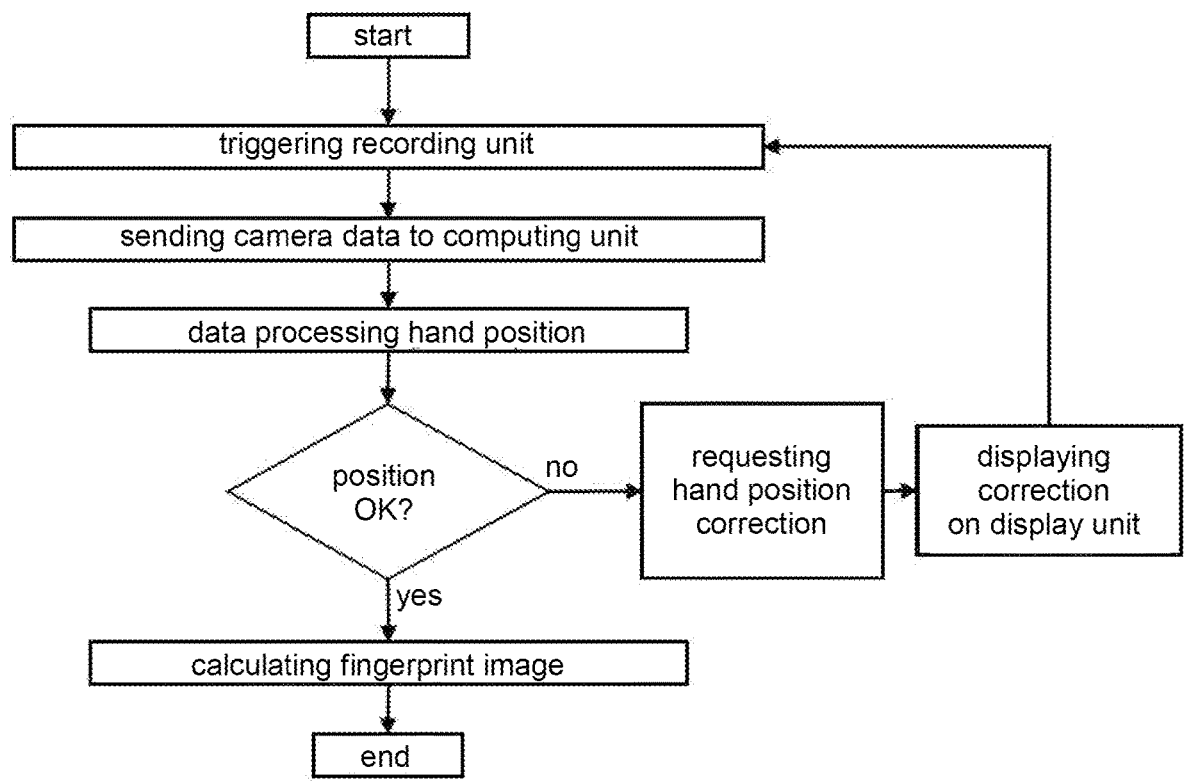
Figure 14:
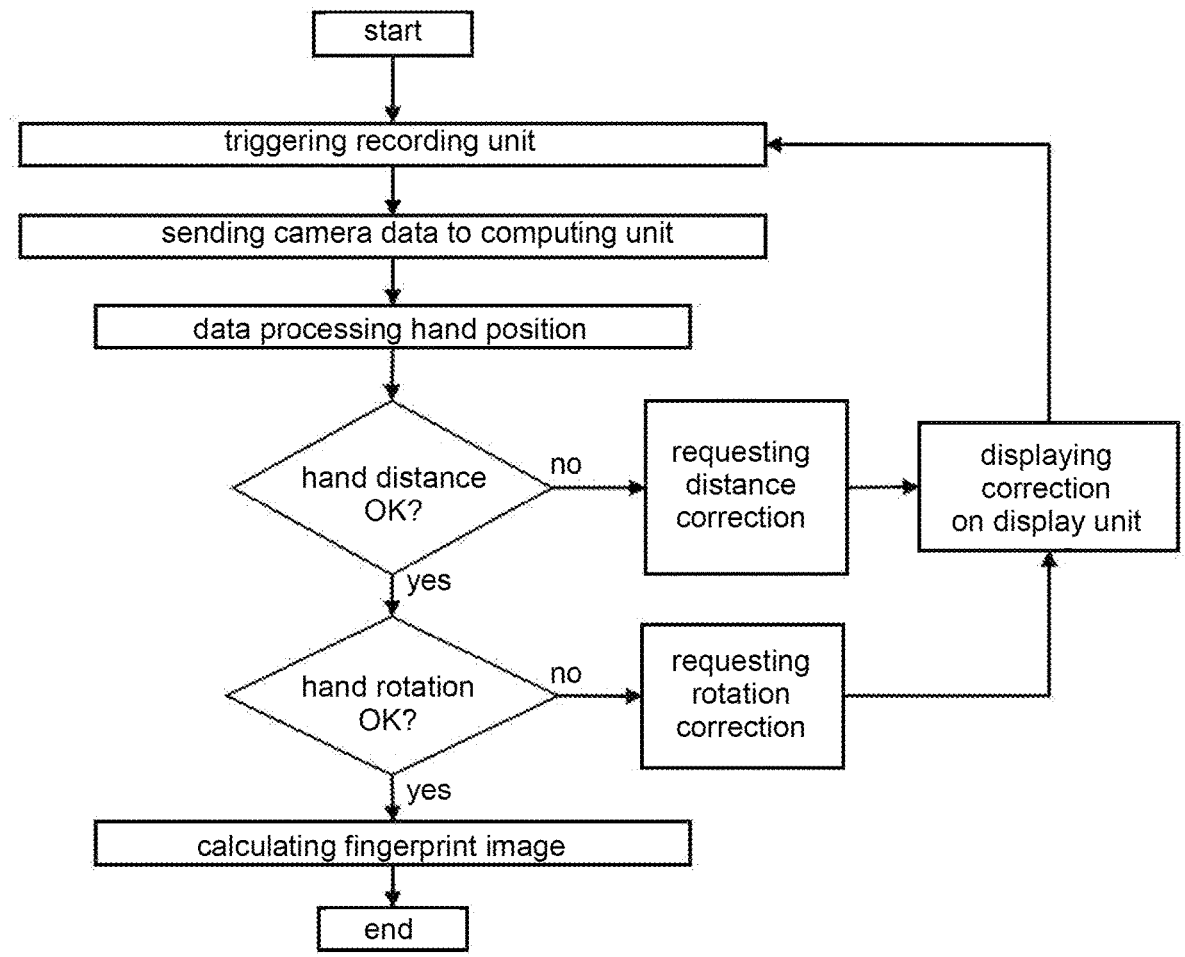
Figure 15:
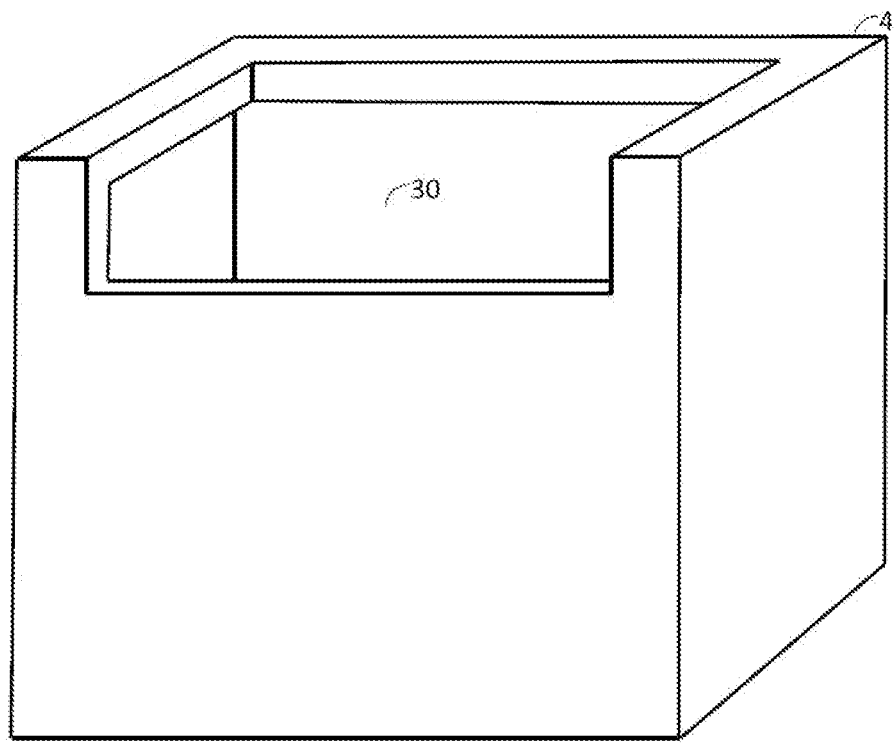
Figure 16:
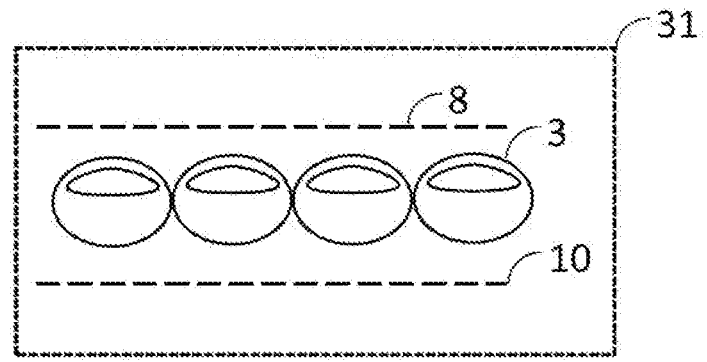
Figure 16:
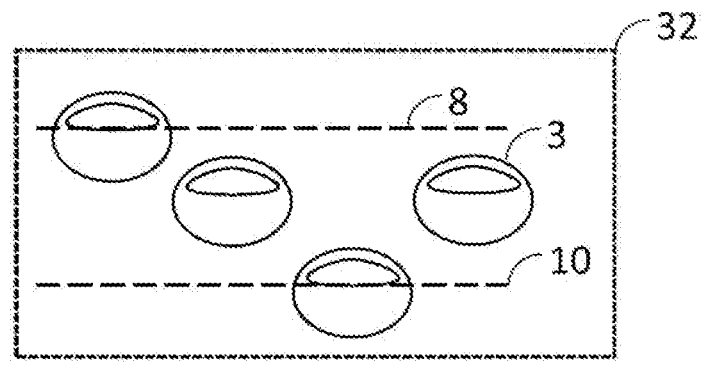
Figure 16:
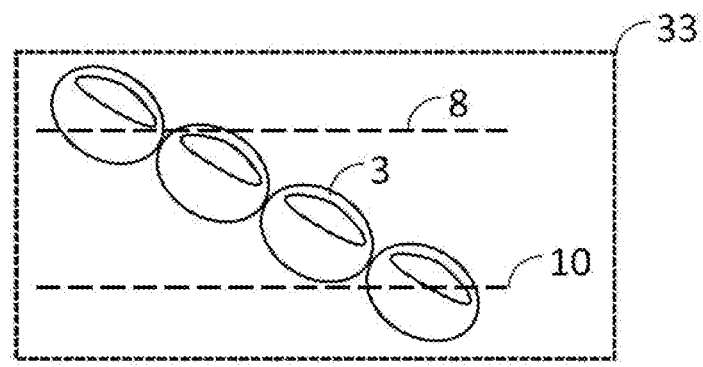
Figure 17:
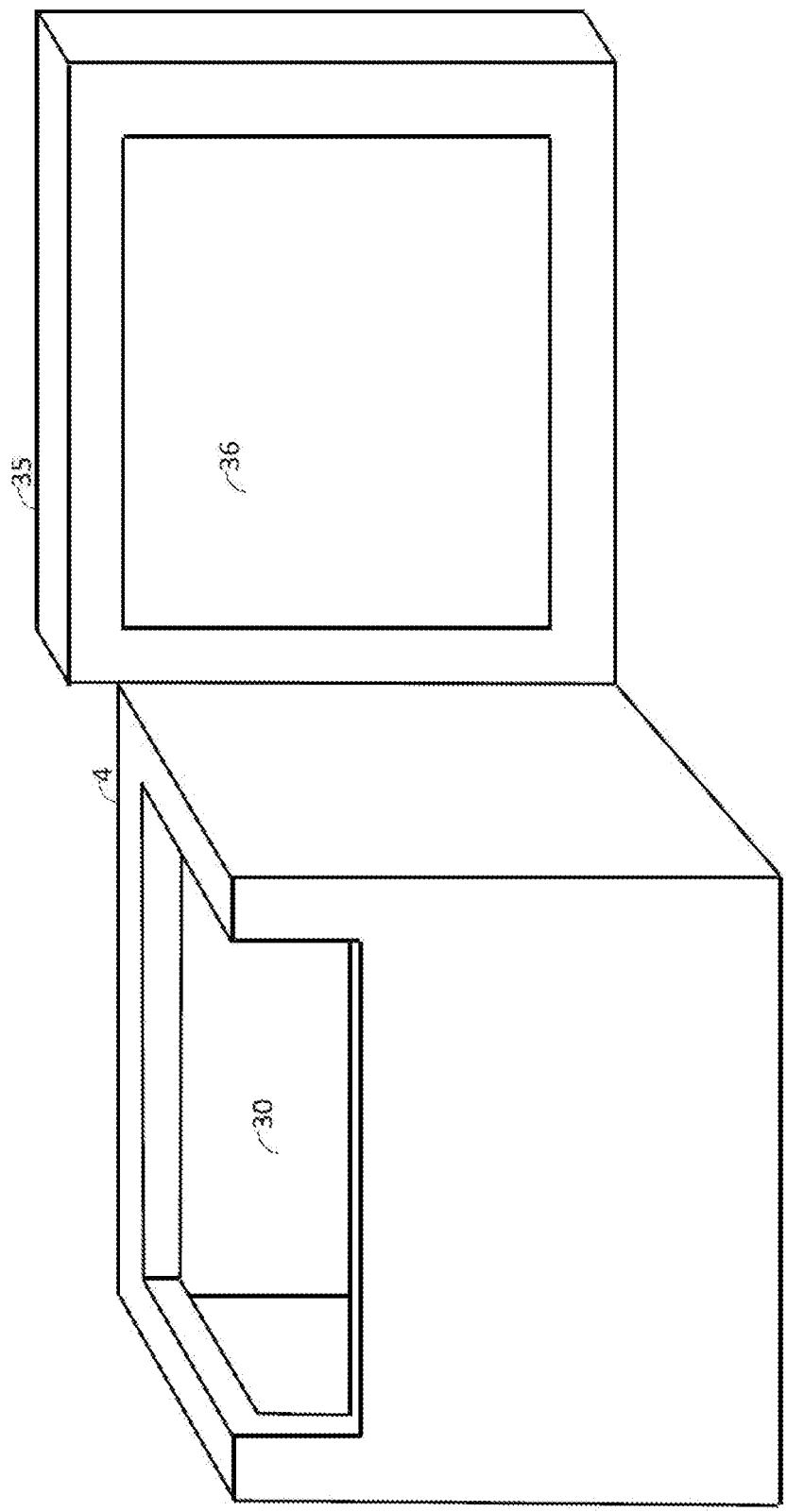

The invention is explained in more details by exemplary embodiments and figures as shown below:

FIG. 1: shows a schematic diagram of the invention for non-contact optical recording of the papillary structure of a hand or parts thereof;

FIG. 2: shows schematically the definition of a tolerance angle that arises on a contact surface during conventional fingerprint recording;

FIG. 3: shows the image sharpness in the sense of a modulation transfer function (MTF) over the emission wavelength of the lighting unit;

FIG. 4: shows the relationship between a structure size on the light modulator of the lighting unit, which is imaged in the structure size in the object plane and correspondingly on the camera sensor;

FIG. 5: shows the representation of the relationship between object distance and measured structure size of the structured lighting on the sensor of the camera for a periodic pattern of structured light;

FIG. 6: shows the representation of the relationship between object distance and measured structure size of the structured lighting on the sensor of the camera for a non-periodic pattern of structured light;

FIG. 7: shows a preferred embodiment of the invention with a projector and a camera, the optical axes of which are aligned parallel to one another and have different distances to the object plane;

FIG. 8: shows a further preferred embodiment comparable to FIG. 7, in which the camera and lighting unit are arranged in a Scheimpflug geometry;

FIG. 9: shows a preferred embodiment in modification of FIG. 8, in which the beam paths of the camera and the lighting unit are folded via deflection mirrors;

FIG. 10: shows a further preferred embodiment of the invention with a projector as a lighting unit and two cameras, the projector having a significant difference in the distance to the hand or parts thereof in comparison to the two cameras;

FIG. 11: shows a further embodiment of the invention modified compared to FIG. 10 with two projectors and three cameras, the projectors having a significant difference in the distance to the hand or parts thereof compared to the three cameras;

FIG. 12: shows a block diagram of an exemplary configuration of the method according to the invention;

FIG. 13: shows an exemplary flowchart for the method for detecting the position of the hand or parts thereof;

FIG. 14: shows a further exemplary flowchart for the method for position detection in terms of the distance and rotation of the hand or parts thereof, FIG. 15: shows a schematic illustration of a possible embodiment of the device;

FIG. 16: shows a schematic representation of correct and incorrect hand positioning by way of example;

FIG. 17: shows a schematic illustration of a possible embodiment of the device including a feedback module configured as a display.

The invention includes, according to the schematic representation of FIG. 1, as a basic principle a device for fingerprint recording 4 and for measuring a distance 16 of the camera 2 to an object plane 21, wherein the camera 2 also being provided for contactless or non-contact optical recording of the papillary structure of at least one finger. The device 4 includes a lighting unit 1 for illuminating a depth of measurement range 24 with structured light and a camera 2 for detecting light that is diffusely reflected from a hand 3 or a part thereof in the object plane 21, wherein a difference 17 of the distance 16 from camera 2 and the distance 15 from the lighting unit 1 to the object plane 21 is present.

According to the invention, the depth of measurement range 24 is described as the range in which the field of view 13 of the lighting unit 1 and the field of view of the camera 14 overlap in 3D space, as shown in FIG. 1. In the case of the parallel alignment of the optical axis 11 of the lighting unit 1 and the optical axis 12 of the camera 2, there is a lower limit of the depth of measurement range 24. In case of the Scheimpflug geometry (see FIG. 8) of camera 2 and lighting unit 1, the depth of measurement range 24 has also a maximum distance. The depth of measurement range 24 corresponds to the range 9 of depth of field of the camera 2.

The lighting unit 1 contained in the device 4 is described by an optical axis 11, a spatial 2D intensity modulator, a field of view 13 of the lighting unit and a light source. If the lighting unit 1 additionally includes a lens for imaging the spatial 2D intensity modulator, it is referred to below as a projector 25. A lighting unit 1 in the sense of the invention serves to emit structured light, in particular the emission of a wavelength (including spectral broadening). It can also be provided that the lighting unit 1 is able to emit two or three wavelengths. A practical form of the lighting unit 1 can, for example, contain one or more LEDs or one or more lasers (not shown).

Another embodiment of the lighting unit 1 emits a wide light spectrum, such as white light LEDs, light sources based on thermal radiation (light bulb) or gas discharge lamps.

In one embodiment of the invention, the emission spectrum of the lighting unit 1 is in the range of 350 nm to 1000 nm. In a further embodiment of the invention, see FIG. 3, the emission spectrum is limited to 450 nm to 550 nm in order to fulfill the MTF requirements of the FBI.

In a preferred embodiment of the invention, the working distance 26 of the camera 2 is not less than 50 mm and not more than 1500 mm. The lower limit results from a sufficient distance between the hand 3 (or parts thereof) and the camera 2 to avoid contact. The upper limit arises for structural reasons.

In a further preferred embodiment of the invention, the working distance 26 of the camera 2 is not less than 200 mm and not more than 400 mm.

In a preferred embodiment of the invention, the distance 28 of the lighting unit 1 to the average depth of field 27 of the camera 2 (or possibly other cameras 2) is not less than 50 mm and not more than 1400 mm. In a further preferred embodiment, the distance 28 of the lighting unit 1 to the average depth of field 27 of the (at least one) camera 2 is not less than 130 mm and not more than 400 mm.

The camera 2 of the device 4, described by an optical axis 12 of the camera 2, a sensor and a lens that images onto the sensor, has a field of view 14 and a range 9 of depth of field, which is limited by a lower limit 10 of the range 9 of depth of field and an upper limit 8 of the range 9 of depth of field. Only in the range 9 of depth of field can the papillary structures of the hand 3 (or parts thereof) be imaged in high quality and on the sensor of the camera 2 in accordance with the authority specifications (FBI guidelines, Appendix F: U.S. Department of Justice, Federal Bureau of Investigation, "Electronic Biometric Transmission Specification (EBTS) with Technical and Operational Updates", version 10.0.9, May 22, 2018).

In an advantageous embodiment within the meaning of the invention, a camera 2 comprises an image sensor and a lens. The image sensor in the sense of the invention is a device that converts an optical signal into an electrical signal that contains the image information. According to the invention, in the following of the image sensor (or the output of the camera 2) there can be a computing unit 29 which is used to process image information. In particular, the computing unit 29 also serves to calculate the spatial information from the image of the image sensor, in particular the 3D detection of a hand 3 or a finger with the papillary structure.

In an advantageous embodiment (according to FIG. 8), the lighting unit 1 is equipped with a lens and thus forms a projector 25, wherein the projector 25 used as the lighting unit 1 has structured lighting and the camera 2 is attached in Scheimpflug geometry. This means that projector 25 and camera 2, based on an object plane 21, fulfill image equalization according to Scheimpflug.

In a further preferred embodiment, as outlined in FIG. 9, the beam paths of the lighting unit 1 and/or the camera 2 are folded via one or more deflection mirrors 5 in order to enable a compact design.

A 2D intensity modulator within the meaning of the invention can comprise a digital light modulator, consisting, for example, of one or more DLP chips (Digital Light Processing), one or more LCDs (Liquid Crystal Device) or one or more LCOS (Liquid Crystal on Silicon). In addition, according to the invention, analog light modulators such as masks, slides, or scattering and phase modulation disks (for generating speckle patterns) can also be used.

In further preferred embodiments of the invention, a lighting unit 1 or a projector 25 and two cameras 2 are used, wherein the lighting unit 1 or the projector 25 being at a different distance from the range 9 of depth of field compared to the working distance 26 of the camera(s) 2 (see FIG. 10) or two projectors 25 or two lighting units 1 and three cameras 2 are used, wherein the projectors 25 or the lighting units 1 having a different distance from the range 9 of depth of field compared to the working distance 26 of the cameras 2 (see FIG. 11).

In a preferred embodiment of the invention, the device 4 has a feedback module 35, which provides the user with information about the correct recording, correction suggestions for the hand position or other information via acoustic, haptic or visual signals or combinations thereof.

In a further preferred embodiment of the invention, the feedback module 35 is configured as a display unit 36 in the form of a display or can also be integrated as an LED line in the upper area of the device 4.

The method according to the invention for real-time detection of the distance of the hand 3 (or parts thereof) to the camera 2 is based on the different distances of the camera(s) 2 and the lighting unit(s) 1 to the hand 3 in the object plane 21 (see FIG. 4).

The basic idea here is to measure the structure size 18 of the structured lighting on the sensor of the camera 2. According to the nomenclature in FIG. 4, the lighting unit 1 projects a spatially varying structure with the structure size 20 in the object plane 21 ($S_0$). The structure size 19 on a light modulator of the lighting unit 1 is $S_p$. The distance 15 of the lighting unit 1 to the object plane 21 ($A_p$) describes the distance from a projector 25 used as the lighting unit 1 to the hand 3 (or parts thereof) and $A_c$ describes the distance 16 of the camera 2 to the object plane 21 of the hand 3. It can be shown mathematically that the measured structure size 18 of the structured lighting on the sensor of the camera 2 ($S_c$) is a non-constant function of the distance 16 ($A_c$) of the camera 2 to the object plane 21, whenever a difference 17 ($\delta \approx 0$) in the distances from camera 2 and lighting unit 1 to the object plane 21 is present.

$$S_c = f(A_c) \text{ for } \delta \neq 0.$$

This in turn means that for $\delta \approx 0$ the distance 16 of the camera 2 to the object plane 21 ($A_c$) can be determined, if the structure size 18 of the structured lighting projected by the lighting unit 1 from the projector 25 on the sensor of the camera 2 ($S_c$) can be measured, which solves the basic problem of the distance measurement.

$$A_c = f(S_c) \text{ for } \delta \neq 0.$$

In the case of the projection of periodic or quasi-periodic patterns, e.g. one- or two-dimensional sinusoidal patterns or point patterns, the imaged structure size $S_c$ can, for example, be easily and efficiently determined from the discrete Fourier transformation (DFT) or its fast implementations (FFT) via a local maximum search in the frequency space. This is also possible using a wavelet transformation. FIG. 5 shows the intermediate steps of the method presented for the projection of a sinusoidal pattern onto the hand 3 or parts thereof (fingers of a hand) by means of a projector 25 having a different distance 15 from the object plane 21 compared to the camera 2 being used for recording. For an almost equal distance to the hand 3 (or parts thereof) for camera 2 and lighting unit 1, there is a constant stripe distance or constant spatial frequency (circles) in the camera image, whereas in the case that the projector 25 only has half the distance to the hand 3, a clear progression of the stripe distance with the distance 16 of the camera 2 to the object plane 21 can be seen.

FIG. 6 shows the intermediate steps of the method presented here for projected non-periodic patterns (speckles). For an almost equal distance to the object plane 21 for camera 2 and lighting unit 1, a constant structure size distribution or constant spatial frequency distribution (circles) results in the camera image, whereas in the case that the lighting unit 1 has only half the distance 16 to the hand 3 (or parts thereof), a clear progression of the structure size distribution with the distance 16 from the camera 2 to the hand 3 can be seen.

If the method described here is applied to several partial images, a reduced-resolution depth map of the recorded and illuminated scene can be generated, making it possible to determine the rotation of the hand 3.

To determine the correct hand positioning 31, a distance of the hand 3 (or parts thereof) and the rotation (twisting) in respect to the range 9 of depth of field are determined. For correct hand positioning 31, see FIG. 16, the parts of the hand 3 to be measured must lie planar in the range 9 of depth of field.

The image analysis 34 generally describes the method for determining the position and orientation of the hand 3 with respect to the camera 2 from the structure size 18 of the structured lighting from the lighting unit 1, imaged on the sensor of the camera 2, wherein special embodiments for the method beforehand were exemplarily shown, see FIG. 5 and FIG. 6.

In a preferred embodiment of the invention, data recording is requested by a computing unit 29, which triggers a trigger signal on a data bus. In the device 4, this results in at least one lighting unit 1 is projecting a stripe pattern and an image of the hand 3 or parts thereof with the projected stripe pattern is recorded synchronously by at least one camera 2. This is forwarded via a further data bus to the data processing unit of the computing unit 29, in which the distance determination is carried out by a maximum search in the frequency space of the entire image and the rotation determination is carried out by an analysis of the maxima in the frequency space of grid elements of the image. Based on the analysis results, a correction determination is made, which is made available to the user as feedback on a display unit 36 via another data bus. A further recording then starts, with an acceptable positioning of the hand 3 in the depth of measurement range 24, which is communicated to the user via the display unit 36, and can be continued either with a new data recording via the camera 2 or with data processing to form a 3D image or a fingerprint image.

FIG. 1 shows a device 4 for contactless optical recording of the papillary structure of a hand 3 or parts thereof, the device 4 having a lighting unit 1 for illuminating a hand 3 (or parts thereof) with structured light and at least one camera 2 for detecting light, which is diffusely reflected from a hand 3 or part of a hand 3 in an object plane 21, wherein substantially a nonzero difference 17 of the distances 15, 16 from the lighting unit 1 and camera 2 to the object plane 21 is present and the camera 2 has a range 9 of depth of field, which is limited by an upper limit 8 of the range 9 of depth of field and a lower limit 10 of the range 9 of depth of field. A quick measurement of the hand position is possible within the depth of measurement range 24, which is given by the overlay area from the field of view 14 of the camera 2 and the field of view 13 of the lighting unit 1 and which contains parts of the range 9 of depth of field of the camera 2.

FIG. 2 shows the definition of a tolerance angle 7, which limits the area of the recorded skin on a contact surface 6 during conventional fingerprint recording and which must also be depicted in accordance with the (authority) requirements during contactless recording.

FIG. 3 shows the image sharpness in the sense of a modulation transfer function (MTF) over the emission wavelength of the lighting unit 1. Above 640 nm, the FBI criterion for sharpness is not achieved at any point. The image sharpness was calculated for an optical imaging system with a working distance of 200 mm at a f-number of 2.5.

FIG. 4 shows, in addition to the quantities shown in FIG. 1, the relationship between a structure size 19 on the light modulator of the lighting unit 1, which is imaged in the structure size 20 in the object plane 21. The structure size 18 of the structured lighting on the sensor of the camera 2 is a function of the distance 16 of the camera 2 to the object plane 21, if the difference 17 of the distances 15, 16 from the lighting unit 1 and camera 2 to the object plane 21 is nonzero.

FIG. 5 shows a method example for the representation of the relationship between the distance 16 of the camera 2 to the object plane 21 and the measured structure size 18 of the structured lighting on the sensor of the camera 2 for a periodic pattern of the structured light of the lighting unit 1, which serves for calculation of the distance 16 of the camera 2 to the real object plane 21 in which the positioning of the hand 3 or parts thereof took place.

FIG. 6 illustrates a further method example for a non-periodic pattern of the lighting unit 1 for illustrating the relationship between the distance 16 of the camera 2 to the object plane 21 and the measured structure size 18 of the structured lighting on the sensor of the camera 2.

FIG. 7 shows a preferred embodiment of the device 4 for contactless optical recording of the papillary structure of a hand 3 or parts thereof, the device 4 having a projector 25 for illuminating the hand with structured light and a camera 2 for detecting light being diffusely reflected from the hand 3 or a part thereof, wherein a projector 25 as the lighting unit 1 substantially has a nonzero difference 17 of the distances 15, 16 from the lighting unit 1 and camera 2 to the object plane 21 to be able to use the methods for position determination of the hand 3 (or parts of it) as described in FIGS. 5 and 6.

FIG. 8 shows a preferred embodiment comparable to FIG. 7, but with the difference that camera 2 and lighting unit 1 are arranged in a Scheimpflug geometry. This results in the advantages that, on the one hand, no areas being not illuminated by the lighting unit 1 can appear in the camera image and, on the other hand, the range 9 of depth of field of the camera 2 and the lighting unit 1 can be aligned in a parallel, overlapping manner.

FIG. 9 shows a preferred embodiment based on FIG. 8 with the difference that the beam paths of the camera 2 and the lighting unit 1 are folded via deflection mirrors 5 in order to achieve a more compact, space-saving design of the device 4.

FIG. 10 shows a preferred embodiment of the device 4 for contactless optical recording of the papillary structure of a hand 3 or parts thereof, the device 4 having a projector 25 for illuminating the hand 3 with structured light and two cameras 2 for detecting light diffusely reflected from a Hand 3 or a part thereof, wherein substantially a nonzero difference 17 of the distances 15, 16 from the lighting unit 1 and camera(s) 2 to the object plane 21 is present. By this configuration of an additional camera 2, it is possible to expand the spatial field of view in the sense of a higher tolerance angle 7.

FIG. 11 shows a preferred embodiment of the device 4 for contactless optical recording of the papillary structure of a hand 3 or parts thereof, the device 4 having two projectors 25 for illuminating the hand 3 with structured light and three cameras 2 for detecting light diffusely reflected from a Hand 3 or a part thereof, wherein substantially a nonzero difference 17 of the distances 15, 16 from lighting unit(s) 1 and camera(s) 2 to the object plane 21 is present.

FIG. 12 shows a block diagram of an exemplary configuration, wherein the data recording is requested by the computing unit 29, which triggers a trigger signal on a data bus, which in the device 4 causes a projector 25 as a special configuration of the lighting unit 1 to project a stripe pattern and, synchronously, an image of the hand 3 to be measured with the projected stripe pattern is recorded by a camera 2. The image is forwarded via a further data bus to the data processing of the computing unit 29, in which the height determination and rotation determination of the hand positioning are carried out, based on the results of which a correction determination is made, which is provided the user with feedback on a display unit 36 via a further data bus.

FIG. 13 shows an exemplary flowchart for the method for position detection, in which, after starting the method, the control of the camera 2 leads to the receipt of image data, after which the step of sending image data to the computing unit 29 carries out data processing to recognize the hand position, whereby incorrect hand positioning in the sense of incorrect distances 32, a correction of the position is requested and this is signaled to the user via the display unit 36. Then another recording starts; If the hand position is acceptable, the process for determining the exact position is completed and an acceptable positioning of the hand 3 in the depth of field range 9 ensures error-free and high-resolution image recording of the papillary structure of a hand 3 or individual fingers thereof.

FIG. 14 shows an exemplary flowchart for the method for position recognition, in which, after starting the method, the triggering of the camera 2 leads to the receipt of image data, after which the step of sending image data to the computing unit 29 results in data processing to recognize the hand position, wherein in case of incorrect hand positioning in the sense of incorrect distances 32, a correction of the position is requested and this is signaled to the user via the display unit 36. Then another recording starts, if the hand position is acceptable, the rotation of the hand is analyzed, wherein, if the hand positioning is incorrect in the sense of incorrect rotation 33, a correction of the rotation is requested and this is signaled to the user via the display unit 36. Then another recording starts; With acceptable hand rotation, the process for determining the exact position is completed and an acceptable positioning of the hand in the range 9 of depth of field ensures error-free and high-resolution image recording of the papillary structure of a hand 3 or parts thereof.

FIG. 15 shows an exemplary design of the fingerprint recording device 4 with a recess 30 on the top, which faces the user, for correct hand positioning 31.

FIG. 16 shows the correct hand positioning 31, in which the hand or parts thereof lie correctly between the upper limit 8 of the range 9 of depth of field and the lower limit 10 of the range 9 of depth of field. In addition, incorrect hand positioning in the sense of incorrect distances 32 of the hand or parts thereof is shown. In addition, incorrect hand positioning in the sense of incorrect rotation 33 of the hand 3 is shown.

FIG. 17 shows an example of the design of the fingerprint recording device 4 with a recess 30 attached to the top, which faces the user, for the correct hand positioning 31 and, inclusive, a feedback module 35, which is configured as a display unit 36 (display).

REFERENCE SIGNS 1 lighting unit
2 camera
3 hand (or parts thereof)
4 fingerprint recording device
5 deflection mirrors
6 contact area
7 tolerance angles
8 upper limit of the range of depth of field
9 range of depth of field
10 lower limit of the range of depth of field
11 optical axis of the lighting unit
12 optical axis of the camera
13 field of view of the lighting unit
14 field of view of the camera
15 distance of the lighting unit to the object plane
16 distance of the camera to the object plane
17 difference in the distances from the camera and lighting unit to the object plane
18 structure size of the structured lighting on the camera's sensor
19 structure size on the light modulator of projector
20 structure size of the structured lighting in the object plane
21 object level
22 effective focal length of the camera lens
23 effective focal length of the lighting unit
24 depth of measurement range
25 projector
26 camera working distance
27 medium depth of field
28 Distance from the lighting unit to the middle plane of depth of field
29 computing unit
30 recess
31 correct hand positioning
32 incorrect hand positioning in the sense of incorrect distances
33 incorrect hand positioning in the sense of incorrect rotation
34 image analysis
35 feedback module
36 display unit

The invention claimed is:

1. A device for contactless optical recording of a papillary structure of a hand or parts thereof, the device comprising:
   a lighting unit illuminating the hand or parts thereof with emitted structured light;
   a camera detecting structured light emitted from the lighting unit, which is diffusely reflected from the hand or parts thereof in an object plane of the camera,
      wherein a nonzero difference in distances between the camera along an optical axis of an optical path of the camera and the lighting unit along an optical axis of an optical path of the lighting unit from the object plane of the camera is present in order to determine a position of the hand or parts thereof along the optical axis of the optical path of the camera in relation to a range of depth of field of the camera using a structure size determined in the light detected by the camera; and
   a computing unit calculating position of the hand or parts thereof by determining structure size in the detected light and calculating a fingerprint image,
   wherein the structure size is progressed away from at least one of a constant stripe distance or a constant spatial frequency as a function of the nonzero difference in distances.

2. The device according to claim 1, wherein a working distance of the camera is at least 50 mm and a maximum of 1500 mm.

3. The device according to claim 1, wherein the distance of the lighting unit to the range of depth of field of the camera is at least 50 mm and 1400 mm at maximum.

4. The device according to claim 1, wherein beam paths of the lighting unit and the camera are non-parallel along the optical axis of the camera and the optical axis of the lighting unit.

5. The device according to claim 4, wherein the beam paths of the lighting unit and the camera are folded space saving via deflection mirrors.

6. The device according to claim 1, wherein the lighting unit has an emitted light spectrum that is in the range from 350 nm to 1000 nm.

7. The device according to claim 1, wherein the lighting unit has a 2D intensity modulator with a lens in front and with a DLP, LCD or LCoS system.

8. The device according to claim 1, wherein a 2D intensity modulator of the lighting unit has a 2D intensity modulator with a diffractive element.

9. The device according to claim 1, wherein the lighting unit has a 2D intensity modulator with a lens in front and with a rigid, rotating or translatory movable transmitted light image.

10. The device according to claim 1, further comprising a feedback module outputting an acoustic signal, a haptic signal, a visual signal or combinations thereof as information about the recording of the papillary structure of the hand or parts thereof in response to correct hand positioning, or as correction suggestions for eliminating incorrect hand positioning in response to incorrect hand distances or or incorrect hand rotation.

11. The device according to claim 10, wherein the feedback module is an integrated a display unit.

12. The device according to claim 10, wherein the feedback module is an LED line integrated in an upper area of the device.

13. A method for contactless optical recording of a papillary structure of a hand or parts thereof, in which the hand or parts thereof of a user is positioned in a depth of measurement range of a device for fingerprint recording, the method comprises:

illuminating the hand or parts thereof with structured light emitted from a lighting unit, wherein a difference in distances between camera along an optical axis of an optical path of the camera and lighting unit along an optical axis of an optical path of the lighting unit from object plane of the camera is present;

detecting a pattern of the structured light emitted from the lighting unit, which is diffusely reflected from the hand or parts thereof, with the camera and transmitting the detected pattern to a computing unit;

determining a structure size of the detected pattern on a sensor of the camera;

calculating the position of the hand or parts thereof along the optical axis of the optical path of the camera by image analysis of the structure size of the detected pattern on the sensor of the camera with respect to a known structure size on a light modulator; and calculating fingerprint images of the hand or parts thereof, when the calculated position is completely within a range of depth of field, wherein the structure size is progressed away from at least one of a constant stripe distance or a constant spatial frequency as a function of the difference in distances.

14. The method of claim 13, wherein the determination of the structure size of the detected pattern on the sensor of the camera occurs via image analysis in a frequency space.

15. The method of claim 13, wherein determination of correct positioning of the hand or parts thereof occurs via image analysis of distances or rotation of the hand or parts thereof with respect to the camera.

16. The method of claim 13, wherein in response to incorrect distances or rotation of the hand or part thereof, correction instructions are issued via a feedback module.

* * * * *